United States Patent

[11] 3,529,547

| [72] | Inventor | Wesley R. Starkey<br>La Grange Park, Illinois |
|---|---|---|
| [21] | Appl. No. | 636,626 |
| [22] | Filed | May 8, 1967 |
| [45] | Patented | Sept. 22, 1970 |
| [73] | Assignee | Starkey Chemical Process Company<br>a corporation of Illinois |

[54] ERROR CORRECTION PROCESS AND COMPOSITION
13 Claims, No Drawings

[52] U.S. Cl..................................................... 101/468,
106/102, 106/188
[51] Int. Cl....................................................... B41m 5/00
[50] Field of Search............................................ 101/468,
149.4; 252/94, 95, 99, 100, 186, 102, 104, 187;
101/423, 424; 252/188, 188.3, 189;
260/606.5; 8/101, 102, 107, 108; 401/119,
126, 130, 201; 23/360, 361

[56] References Cited
UNITED STATES PATENTS

| 3,147,309 | 9/1964 | Jenkner..................... | 252/188X |
| 3,299,808 | 1/1967 | Zitt............................ | 101/468UX |

OTHER REFERENCES

Gerrard, W.: The Organic Chemistry of Boron, 1961, Academic Press, New York, page 160 made of record.

*Primary Examiner*—David Klein
*Attorney*—Hofgren, Wegner, Allen, Stellman and McCord ABSTRACT: A spirit duplicating master eradication process and composition. The composition is a solution of pyridine borane in a mutual solvent for the pyridine borane and the dye vehicle in the master ink and is used in the process by applying it to an error until the error bleaches out. The pyridine borane can be used alone or in combination with another tertiary amine borane or a primary (*e.g.* t-butyl) or secondary (*e.g.* dimethyl) amine borane but in the case of primary or secondary amine boranes, it is preferable in the complete absence of aminoborane.

ERROR CORRECTION PROCESS AND COMPOSITION

BACKGROUND OF THE INVENTION

1. Field of the Invention

This invention relates to a process and composition for eradicating errors on spirit duplicating masters. More particularly the invention relates to such process or composition in which the bleaching agent and spirit dye vehicle solvent are present in a single component system which is shelf stable.

2. Description of the Prior Art

Inks used in making masters for spirit duplicating processes contain strong dyes such as methyl violet dye, usually in a wax or wax and oil binder. Although ink eradicator systems have previously been proposed, it has remained a problem to develop an inexpensive, shelf stable, clean and operative system for eradicating these strong dyes. Thus far, eradication of such dyes for correction of errors on masters has usually involved one of three procedures. One procedure is to mask the error with a tape and reprint over the tape; this procedure is disadvantageous in that it leaves a high spot on the master which may show on the copies produced from the master. A second procedure involves painting the error with an opaque film and reprinting or writing thereover. Again, this does not produce a smooth master, and the copies can reflect the lack of smoothness. A third procedure, which is widely used, is to scrape the erroneous printing from the master using a razor blade or the like and to then reprint; the disadvantage of this procedure is that the powerful dye becomes spread all over the premise and personnel.

I noted the recent issuance of U.S. Pat. No. 3,299,808 to Arthur Zitt on January 24, 1967. This patent proposes a stabilized correction fluid containing a borohydride and wax solvent and usually containing a stabilizer which apparently functions by raising the pH of the solution above 11. Arthur Zitt has marketed a formulation made under this patent, and I have acquired and tested a sample of it. I have found that, although a certain amount of stability has been achieved, the product is stable for only a few weeks at most. In fact, after one month's storage at room temperature, the product was no longer capable of bleaching a spirit master error. Thus, although the product may find acceptance where it is to be used up within a week or so, it is not acceptable for my purposes, i.e., for supplying small quantity users where a shelf life of six months to a year is necessary.

Borohydrides are ionic salts having a cation and a $BH_4$ anion. Morpholine borane is a secondary amine borane. Amine boranes are coordination compounds having the group $\equiv N : BH_3$.

SUMMARY OF THE INVENTION

I have now discovered that pyridine borane is an excellent correction fluid bleach and is stable in solution in spirit duplicating dye vehicle solvent even in the presence of aminoborane and that primary and secondary amine boranes can be stabilized even in combination with pyridine in such solution preferably in the absence of aminoborane. The present invention contemplates shelf stable spirit duplicating correction fluid containing pyridine borane, which is a tertiary amine borane, and also contemplates a spirit master eradication process using such correction fluid.

INFORMATION ON DEVELOPMENT OF INVENTION

I had been experimenting with various bleaches in an attempt to find a shelf stable, one component correction system. My first successful system used pyridine borane as the bleach. It seemed unusual that pyridine borane would succeed while morpholine borane did not, so I inquired about impurities present in the morpholine borane supplied to Zitt. I was informed that the morpholine borane, a secondary amine borane, contained trace amounts of the corresponding aminoborane, i.e., having the group $\equiv NBH_2$. Since the aminoborane would be impossible to form with pyridine borane, a tertiary amine, I proceeded on the theory that the aminoborane could be responsible for instability of the primary and secondary amine boranes and this was confirmed. It was also confirmed that even primary and secondary aminoboranes would not render a tertiary amine borane unstable. This is because the instability reaction proceeds by transforming the amine borane to aminoborane when aminoborane is initially present even in trace amounts, and it is impossible to so transform a tertiary amine borane. The aminoboranes are believed to then polymerize to dimers and trimers which further catalyze the reaction transforming more amine borane to aminoborane. On this basis I tested the other available tertiary amine boranes, i.e., trimethyl and triethyl, and found that they alone, as well as the primary and secondary amine boranes, did not have proper bleaching power.

DESCRIPTION OF THE PREFERRED EMBODIMENTS

The compositions of this invention are solutions of pyridine borane, alone or in the presence of other amine boranes, in solvents for the spirit duplicating dye vehicle. This vehicle is usually a wax or wax-resin formulation. The amine boranes are highly soluble in various organic solvents so that almost any solvent which will solubilize the dye vehicle also functions as a solvent for the amine borane. The amine boranes can be considered as having following formula:

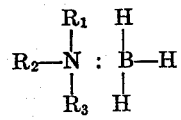

wherein $R_1$, $R_2$ and $R_3$ represent at least one organic group and the remainder of $R_1$, $R_2$ and $R_3$ are hydrogen. For example, anywhere from one to three of the R groups can be univalent organic groups or two or three of $R_1$ through $R_3$ can represent a divalent or trivalent group such as in a heterocyclic amine. The nature of the organic group or groups is unimportant except for the distinction between (1) the primary and secondary amine boranes and (2) the tertiary amine boranes as described above. Thus, $R_1$ through $R_3$ can be selected from the class of aliphatic, aromatic, cycloaliphatic and other cyclo groups providing a heterocyclic ring with the nitrogen, including substituted such groups, but at least one of the R groups does represent an organic group.

Specific examples of the amine boranes include the primary, secondary and tertiary amine boranes such as the boranes of methylamine, t-butylamine, eicosylamine, dimethylamine, dihexylamine, dioctadecylamine, methyloctadecylamine, trimethylamine, triethylamine, tridodecylamine, trieicosylamine, methyldioctadecylamine, dimethylheptadecylamine, methoxyamine, ethylhydroxylamine, hydroxystearylamine, di(hydroxystearyl) amine, benzlamine, triphenylamine, o-chloroaniline, o-nitroaniline, pyrrole, pyrrolidine, proline, pyrazole, 2-pyrazoline, indole, 3 (2)-pyrazolone, skatole, carbazole, antipyrine, pyridine, acridine, and including mono-, di- and polyboranes of diamines triamines, and other polyamines such as benzenediamine, N-octadecylpropylenediamine, ethylenediamine, tetraethyltriamine, tetraethylpentamine, etc. The amine boranes are usually prepared by reacting diborane with the corresponding amine. The normally liquid amine boranes are preferred to the solid ones.

Any mutual solvent for the borane and the dye vehicle can be used. Such solvents include but are not limited to the hydrocarbons, halohydrocarbons, halocarbons, alcohols, carboxylic acids and their esters, ethers, aldehydes, etc., including ethylacetate, isopropylacetate, methyloctanoate, diethylmalonate, acetone, trichloroethylene, hexachlorocyclohexane, hexachlorobenzene, trifluoromethylbenzene, benzene, toluene, xylene, hexane, cyclohexane, anthracene, octane, ethanol, isopropenol, isobutane, acetaldehyde, etc. The solvent should be sufficiently volatile to evaporate under normal room temperature conditions so that after it has dissolved the dye vehicle to permit better action of the bleach and after the bleach has bleached the error, the solvent will evaporate quickly so that the eradicated portion of the master can be reprinted. Otherwise, the nature of the solvent is unimportant. Water alone, of course, will not be used as a solvent because it is not a solvent for the spirit dye vehicle so that the solvent will be at least in part aromatic. Further, although water can be tolerated in the presence of an organic solvent, it should not be present in such an amount as to retard room temperature vaporization, The amount of bleach used in the solution is sufficient to effect the desired bleaching of the printed error dye. Preferably the bleach should not be so concentrated in the solvent in an eradication formulation to permit accumulation of a sufficient amount of bleach on the error that might prevent reprinting; specifically I have found that sometimes high concentrations of bleach apparently become absorbed within the master material and prevent reprinting until the bleach has had a chance to decompose. Usually an amount of bleach within the range of 0.1 to 10 weight percent will be used, although it is conceivable that at least 0.01 or less percent may be used. Also, concentrates containing from less than 10 percent up to 50 percent or more of the amine borane bleach may be prepared and marketed for dilution by the user. Pyridine borane is normally liquid and highly soluble for forming such concentrates. The concentrates can be used as bleaches at full strength, but this is not preferred. Usually the pH of the solution will be in the range of 5 to 10, and the preferred solutions have a pH in the range of 7 to 8. The pH can easily be adjusted by acid or base, more usually base, as needed.

Where pyridine borane is used as the sole amine borane, in the more advantageous formulations, it will be used in amounts of from 0.1 to 10 weight percent, preferably 0.5 to 2 weight percent, in the solvent. Where other amine boranes are used in combination with pyridine borane, in such more advantageous compositions, the lower end of the pyridine borane range can be reduced to .05 weight percent, preferably only to 0.2 weight percent. Any ratio of pyridine borane to other amine borane can be used e.g., in the range of 1:0 to 1:10.

The following examples are offered for purposes of illustrating the invention but are not intended as limitations thereon. The examples are reported in the table below, and each example was prepared merely by adding the indicated amount of amine borane to the indicated amount of solvent. I usually worked with 100 g. batch preparation and the amounts of ingredients are reported in the table as parts by weight.

less than 30 seconds. In each case the sample usually bleached an error from the master and evaporated to dryness within about one minute, the drying time depending on the volatility of the solvent used. In Example 1 the solution shows whitish deposits after one day standing, and Example 2 was somewhat cloudy, but this apparently did not adversely affect the potency or shelf life. Examples 4 and 9 were found to smear the master when applied for error correction but the smear soon disappeared. Examples 10–12 and 15 resulted in a permanent halo being formed around the eradicated error, but in the case of Examples 10 and 12 this error did not print even on the first copy made from the master; the halo on Example 11 printed on the first copy but not the second. Examples 15–21 usually require several minutes for bleaching. Examples 16–18, 20 and 21 do not leave a printable halo. Where pyridine borane was omitted from Examples 15–18, 20 and 21, some unbleached color remained on the master which usually printed on the first 5 to 12 copies. Increasing the amount of other amine borane to five per cent, in the absence of pyridine borane did not markedly increase the bleaching power of the correction fluid. The formulations are apparently shelf stable up to six months to a year.

In some uses, especially where concentrations of two percent or more pyridine borane are used, it has been found that after the corrected master is stored for a period of time, e.g., one week to one month, the corrected error deteriorates. This is because some pyridine borane remains at the corrected error and causes some bleaching over the period of storage time. It has been found that this bleaching can be alleviated by applying a "buffer" over the erasure before printing the correction. A "buffer" as used herein is a volatile solvent for the pyridine borane and can be any of the solvents mentioned hereinabove. The effect of the buffer is to dissolve and violatilize any residue pyridine borane. Methanol and ethanol have been found to be very suitable and isopropyl acetate is very good but it is flammable; however, isopropyl acetate and other flammable solvents can be rendered non-flammable by mixing with such non-flammable solvents as the halocarbons and halohydrocarbons. A mixture of 40 percent isopropyl acetate and 60 percent 1,1,1,-trichloroethane has been used with excellent results.

All percents given herein are percents by weight unless otherwise indicated.

The foregoing detailed description is given for clearness of understanding only and no unnecessary limitations are to be understood therefrom, as some modifications will be obvious to those skilled in the art.

|  | Example Number | | | | | | | | | | | | | | | | | | | | | | |
|---|---|---|---|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Pyridine borane | 8 | 4 | 2 | 2 | 4 | 2 | 2 | 2 | 4 | 0.25 | 0.5 | 0.5 | 1 | 1 | 0.25 | 0.25 | 0.25 | 0.25 | 0.25 | 0.25 | 0.25 | 1 | 1 |
| Trimethylamine borane |  |  |  |  |  |  |  |  |  |  |  |  |  |  |  | 1 |  |  |  |  |  |  |  |
| Triethylamine borane |  |  |  |  |  |  |  |  |  |  |  |  |  |  |  |  | 1 |  |  |  |  |  |  |
| Dimethyloctadecylamine borane |  |  |  |  |  |  |  |  |  |  |  |  |  |  |  |  |  | 1 |  |  |  |  |  |
| N,N,N,N',N',N'-hexamethyl ethylene diamine diborane |  |  |  |  |  |  |  |  |  |  |  |  |  |  |  |  |  |  | 1 |  |  |  |  |
| Dimethylamine borane |  |  |  |  |  |  |  |  |  |  |  |  |  |  |  |  |  |  |  | 1 |  |  |  |
| Morpholine borane |  |  |  |  |  |  |  |  |  |  |  |  |  |  |  |  |  |  |  |  | 1 |  |  |
| t-Butylamine borane |  |  |  |  |  |  |  |  |  |  |  |  |  |  |  |  |  |  |  |  |  | 1 |  |
| Isopropyl ether | 92 | 48 |  |  |  |  |  |  |  |  |  |  |  |  |  |  |  |  |  |  |  |  |  |
| Freon TF [1] |  | 48 |  |  | 49 |  |  |  |  |  |  |  | 49.5 | 49 |  |  |  |  |  |  |  |  |  |
| 1,1,1-trichloroethane |  |  | 98 |  | 96 | 49 |  | 49 | 48 | 65 | 65 | 50 | 50 | 50 | 65 | 50 | 50 | 50 | 65 | 50 |  | 65 | 65 | 99 |
| Methylene chloride |  |  |  | 98 |  |  |  |  |  |  |  |  |  |  |  |  |  |  |  |  |  |  |  |
| Freon TA [2] |  |  |  |  |  |  | 98 | 49 | 48 |  |  |  |  |  |  |  |  |  |  |  |  |  |  |
| Isopropyl acetate |  |  |  |  |  |  |  |  |  | 34.75 | 34.5 |  |  |  | 33.75 |  |  |  | 33.75 |  | 33.75 | 34 |  |
| Freon TMC [3] |  |  |  |  |  |  |  |  |  |  |  | 49 |  |  |  | 49 | 49 | 49 |  | 49 |  |  |  |

[1] Trichlorotrifluoroethane reported to have the formula CCl₂FCClF₂.
[2] Azeotrope of Freon TF and ethyl alcohol.
[3] Azeotrope of Freon TF and methylene chloride.

Of the above, Example 14 is especially preferred. In testing the formulations as eradication fluids for spirit duplicating masters using methyl violet dye in a wax resin vehicle, it was noted that some of the examples gave relatively slow bleaching times of 30 to 40 seconds, e.g., Examples 1–4, while others, such as Examples 5, 7, 13 and 14, bleached in much

I claim:
1. A process for eradicating an error on a spirit master sheet where the error is formed of dye in a dye vehicle, which process comprises applying to the dye a shelf stable eradicating fluid consisting essentially of a solution of pyridine borane in a volatile mutual solvent for pyridine borane and dye vehicle.

2. The process of claim 1 wherein said solution contains, in addition to pyridine borane, another tertiary amine borane having three valences satisfied by carbon atoms.

3. The process of claim 1 wherein said solution contains, in addition to pyridine borane, an amine borane selected from the class consisting of primary and secondary amine boranes in the absence of aminoborane.

4. The process of claim 3 wherein said additional amine borane is a primary amine borane in the absence of aminoborane.

5. The process of claim 3 wherein said additional amine borane is a secondary amine borane in the absence of aminoborane.

6. The process of claim 1 including the step of applying a volatile solvent for pyridine borane to the eradicated portion of the master and permitting it to vaporize pyridine borane from said portion.

7. A process for correcting a spirit duplicating master which comprises the eradicating process of claim 1 and the step of reprinting over the eradication using spirit duplicating dye.

8. A process for correcting a spirit duplicating master which comprises the eradicating process of claim 6 and the step of reprinting over the eradication using spirit duplicating dye after the step of applying the volatile solvent and permitting it to vaporize.

9. A shelf stable spirit master eradicating composition which consists essentially of a solution of 0.05 to 50 weight percent amine borane in a volatile mutual solvent for the amine borane and the dye vehicle, said amine borane consisting essentially of pyridine borane.

10. The composition of claim 9 including another amine borane besides pyridine borane and being selected from the class consisting of primary, secondary and tertiary amine borane and said composition being in the complete absence of aminoborane when said other amine borane is primary or secondary amine borane.

11. The composition of claim 10 wherein said other amine borane is a tertiary amine borane having three valences satisfied by carbon atoms.

12. The composition of claim 9 which is a concentrate containing 10 to 50 percent of the amine borane.

13. The composition of claim 9 in use dilution and containing from 0.05 to 10 weight percent amine borane.